Dec. 25, 1962

W. C. RIVERS 3,070,400

VAN BODY DOOR CONSTRUCTION

Original Filed March 13, 1957

INVENTOR
William C. Rivers
BY George H. Baldwin
ATTORNEY

United States Patent Office 3,070,400
Patented Dec. 25, 1962

3,070,400
VAN BODY DOOR CONSTRUCTION
William C. Rivers, P.O. Box 2239, Jacksonville, Fla.
Original application Mar. 13, 1957, Ser. No. 645,775. Divided and this application Mar. 25, 1960, Ser. No. 17,679
4 Claims. (Cl. 296—28)

This invention relates to van or truck bodies, trailer and semi-trailer bodies and the like.

An object of the invention is to provide a van body of improved construction.

Another object is to provide an improved door arrangement openable to swing flat against the side walls of the body and openable to expose the full width of the body interior, and closable with improved weathertight seal.

Figure 1:
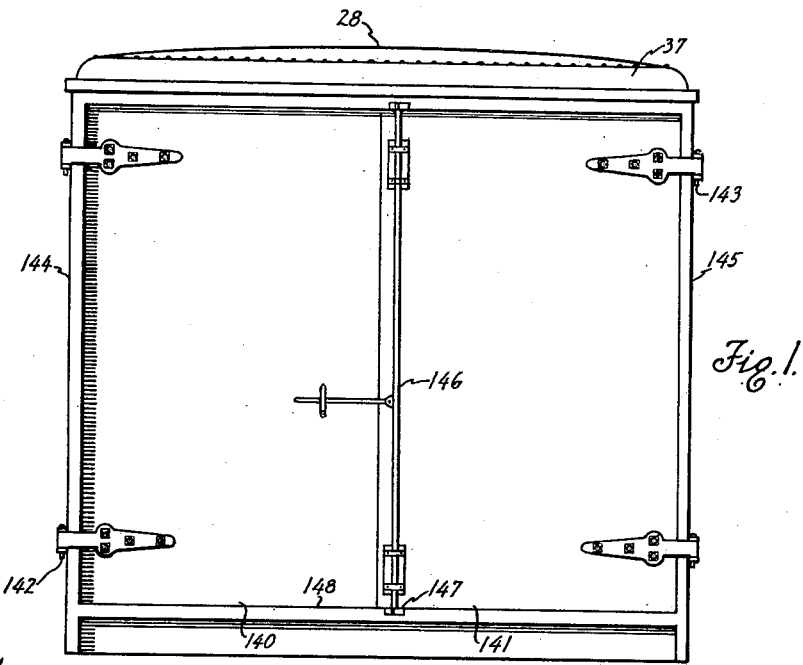
Figure 2:
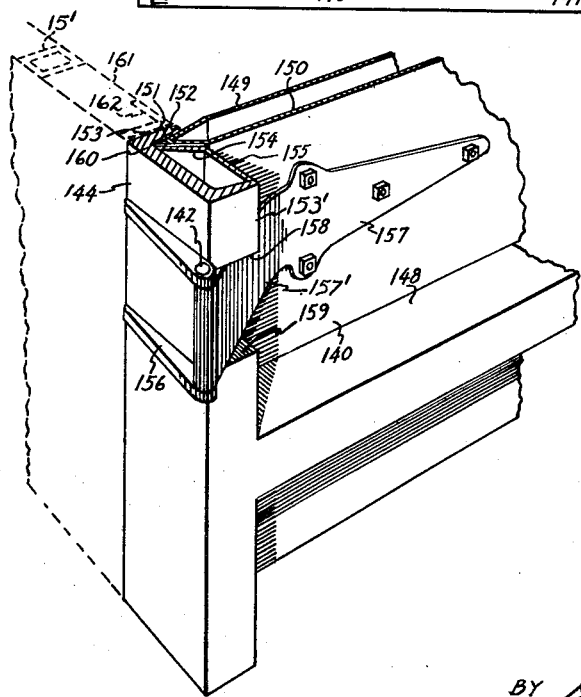

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing, in which:

FIG. 1 is a rear elevation of a van body showing a door arrangement of a construction in accordance with the present invention; and FIG. 2 is a detail view showing, on an enlarged scale, broken away portions of the door arrangement of FIG. 1.

A rear door arrangement for the van body is shown in FIGS. 1 and 2 in accordance with the present invention, the arrangement being particularly adapted for use when it is desired that the doors expose the full width of the inside of the body, to facilitate loading and unloading, or when it is desired that the doors be swingable through about 270 degrees to lie flat against the outer side wall and thus substantially completely out of the way, when open. As shown in FIG. 1 the doors 140 and 141 are mounted to swing on hinge pins 142 and 143, respectively, which are disposed preferably slightly outwardly of the door frame side members or rear corner posts 144 and 145 of the body, while a lock bar assembly 146, mounted to door 141, is arranged to engage with catches, such as catch 147 located in the sill 148, thereby to hold door 141 shut. Door 141 slightly overlaps door 140 to hold it shut until door 141 is opened. The slightly arched roof 28 and rear section 37 of the top rail as seen in FIG. 1 are identical to the body portions specifically disclosed in my parent application entitled Vehicle Body Structure for a Truck or Semi-Trailer, Serial No. 645,775, filed March 13, 1957, now abandoned, and in the continuation application thereof entitled Vehicle Body Structure for a Truck or Semi-Trailer, Serial No. 70,081, filed November 17, 1960.

In FIG. 2, the inner and outer walls 149 and 150 are seen to meet in a tapered edge 151 which substantially conforms to and is complementary with groove 152, edge 151 entering into groove 152 when the door is closed. Edge 151 is shown as being formed by walls 149 and 150 into a V-shaped edge which engages within a V-shaped groove 152. The walls of groove 152 include an inner portion 153 of door frame side member 144 and the portion 154 of a filler or cover strip 155 which encloses the side member. As seen, the side member 144, may be formed of a structural channel member. Stationary hinge plate 156 is fixed to member 144, while the hinge plate 157 is fixed to the door 140. Hinge plate 157 may be shaped or offset at 157′ in a manner to require notching of member 144 as at 158, and a sealing portion 159 may be arranged to prevent water from entering the member 144. It will be seen that the swinging of door 140 about hinge pin 142 will result in the movement of edge 151 substantially out of groove 152 in a direction such that no part of the edge 151 will strike or rub against any part of the groove 152. This result is obtained by the positioning of hinge pin 142 rearwardly of the groove by a distance substantially greater than the depth of the groove, for example 2 or 3 times the depth of the groove and by proportioning the groove to have a relatively wide angle between its walls 153 and 154, such as an angle of about 45 degrees. Appropriate weather stripping, such as foam rubber or felt, is preferably provided as at 160 within the groove to form a tight weatherproof seal for the body.

The doors may be freely swung on the hinge pins 142, 143 through 270 degrees to positions parallel to the body walls, and it will be seen that the full interior width is then exposed, the inner faces of the side wall posts being represented by broken line 161 and exemplary side wall posts 15′ and 162, also shown in broken lines, in FIG. 2. To permit the doors to be swung in this manner, pin 142 is located outwardly of the inner edges or portions of post 144, as defined by filler 155 or line 161, so as not to protrude into the opening, while the pin is also located either slightly outwardly of the outer side wall or so close to the outer side wall line that the offset 157′ of leaf 157 is sufficient to permit the door to swing open against the outer side wall.

The rear corner post 144 may be connected at flange 153 by bolts (not shown) to a rear end side wall post 162, shown in broken lines, and the skin folded therebetween, all as described in connection with the comparable structure for the right front corner post in my above-mentioned applications Serial No. 645,775, and Serial No. 70,081.

It will be noted that the disposition of the weatherstripping 160 between the heavy flanges 153 and 153′ of the channel member 144 protects the weatherstripping, and filler strip 155 is similarly protected, against damage from articles passing through the door opening which may bump the door post, or rear corner post, 144.

This application is a division of applicant's parent application Serial No. 645,775, filed March 13, 1957, entitled Vehicle Body Structure for a Truck or Semi-Trailer.

While only a certain preferred embodiment of this invention has been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. In a van body, a vertical door post having an inner face defining the side of a door opening, said inner face having an outer edge and an inner edge, said post having a V-shaped groove along said face between said edges, weatherstripping within said groove, a door having spaced inner and outer walls joined along a V-shaped edge substantially conforming to and nestingly fitted within said groove sealingly against said weatherstripping when said door is shut, a hinge having a leaf attached to said door, a leaf attached to said post and a vertical hinge pin spaced rearwardly from said groove by a distance equal to at least approximately twice the depth to which said door edge enters said groove.

2. In a van body, a vertical inwardly opening channel corner post of said body, said post having a pair of spaced flanges, a filler strip connected to one said flange and extending toward the other said flange and defining the side of a door opening, said other flange and said strip defining therebetween a groove, a door having when closed an edge portion entering said groove, a hinge having a first hinge leaf connected to said post and a second hinge leaf connected to said door adjacent said edge portion thereof and a hinge pin connecting said leaves and disposed rearwardly of said door edge portion and outwardly of the inner edge of said post, and weatherstripping in said groove between said other flange and strip engaged by said edge portion when said door is closed, said door when closed being disposed sufficiently forward of said hinge pin that upon opening said door swings around said post freely through at least substantially 270 degrees.

3. In a van body having a side wall assembly terminating rearwardly at a vertical door post substantially coplanar with said side wall assembly, said post having an inner edge adjacent said side wall assembly and an outer edge connected by an inner face defining the side of a door opening, said post having a V-shaped groove along said face adjacent said inner edge, a door having spaced inner and outer walls joined along a V-shaped edge substantially conforming to and nestingly fitted within said groove when said door is closed, a hinge having a leaf attached to said door, a leaf attached to said post and a vertical hinge pin spaced rearwardly from said groove adjacent said outer edge of said post so that said door swings freely around said post.

4. In a van body having a side wall terminating rearwardly at a vertical door post, said post including a channel having inwardly directed flanges, a strip connected to one said flange and extending forwardly toward the other said flange and defining the side of a door opening, said strip having an outwardly directed flange portion, weatherstripping between said other flange and said flange portion of said strip, a door having when closed an edge entering between said other flange and said flange portion and sealing against said weatherstripping, a hinge having a first leaf connected to the outer face of said post and a second leaf connected to said door adjacent said edge thereof and a vertical hinge pin connecting said leaves, said pin being disposed rearwardly of said door edge and outwardly of said outer face of said post so that said door when opened swings around said post freely from its closed position through substantially 270 degrees into a position substantially parallel to said side wall assembly and said outer face of said post.

References Cited in the file of this patent
UNITED STATES PATENTS

| | | |
|---|---|---|
| 964,020 | Heintzelman | July 12, 1910 |
| 1,231,069 | Schaffert | June 26, 1917 |
| 1,696,910 | Gilpin | Jan. 1, 1929 |
| 1,865,052 | Wolters | June 28, 1932 |
| 1,876,660 | Giltsch et al. | Sept. 13, 1932 |
| 1,930,635 | Wessling | Oct. 17, 1933 |
| 2,069,237 | Fitch | Feb. 2, 1937 |
| 2,793,068 | Tenenbaum | May 21, 1957 |
| 2,839,791 | Lee | June 24, 1958 |